(12) United States Patent
Schmidt et al.

(10) Patent No.: US 11,279,472 B2
(45) Date of Patent: Mar. 22, 2022

(54) LANDING GEAR FOR CARGO AIRCRAFT

(71) Applicant: The Boeing Company, Chicago, IL (US)

(72) Inventors: Gregory M. Schmidt, Forest Park, WA (US); Justin Duane Cottet, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 16/405,794

(22) Filed: May 7, 2019

(65) Prior Publication Data

US 2020/0354042 A1 Nov. 12, 2020

(51) Int. Cl.
*B64C 25/12* (2006.01)
*B64C 25/18* (2006.01)
*B64C 25/14* (2006.01)
*B64C 25/34* (2006.01)
*B64C 25/16* (2006.01)

(52) U.S. Cl.
CPC .............. *B64C 25/12* (2013.01); *B64C 25/14* (2013.01); *B64C 25/16* (2013.01); *B64C 25/18* (2013.01); *B64C 25/34* (2013.01)

(58) Field of Classification Search
CPC ......... B64C 25/18; B64C 25/10; B64C 25/60; B64C 25/62; B64C 25/58; B64C 25/26; B64C 25/28; B64C 25/14; B64C 25/20; B64C 25/22
See application file for complete search history.

(56) References Cited

U.S. PATENT DOCUMENTS

| | | | | |
|---|---|---|---|---|
| 2,659,555 A | * | 11/1953 | Schlender | B64C 25/34 244/102 R |
| 3,136,505 A | * | 6/1964 | Fleury | B64C 35/00 244/101 |
| 3,315,919 A | * | 4/1967 | Perdue | B64C 25/34 244/102 R |
| 3,335,981 A | * | 8/1967 | Pauli | B64C 1/22 244/102 R |
| 3,653,615 A | * | 4/1972 | Spence | B64C 1/1415 244/137.1 |
| 5,000,400 A | * | 3/1991 | Stuhr | B64C 25/10 244/101 |
| 5,100,083 A | * | 3/1992 | Large | B64C 25/34 244/102 R |
| 6,173,920 B1 | * | 1/2001 | Meneghetti | B64C 25/34 244/100 R |
| 2008/0251641 A1 | * | 10/2008 | Sprenger | B64C 1/068 244/118.5 |

(Continued)

*Primary Examiner* — Joshua J Michener
*Assistant Examiner* — Colin Zohoori
(74) *Attorney, Agent, or Firm* — Duft & Bornsen, PC

(57) ABSTRACT

Systems and methods for wide set retracting landing gear of a cargo aircraft. One embodiment is an aircraft that includes a fuselage including a nose, and a pair of main landing gears comprising a pair of main posts disposed across the fuselage, each main post having a main wheel and configured to pivot forward toward the nose to retract the main wheel. The aircraft also includes a pair of nose landing gears comprising a pair of nose posts disposed across the fuselage, each nose post having a nose wheel and configured to pivot inboard to retract the nose wheel.

20 Claims, 7 Drawing Sheets

(56) References Cited

U.S. PATENT DOCUMENTS

2011/0168832 A1\* 7/2011 Funck .................... B64C 39/08
  244/12.1
2012/0217341 A1\* 8/2012 Bennett .................. B64C 25/20
  244/102 A \* cited by examiner

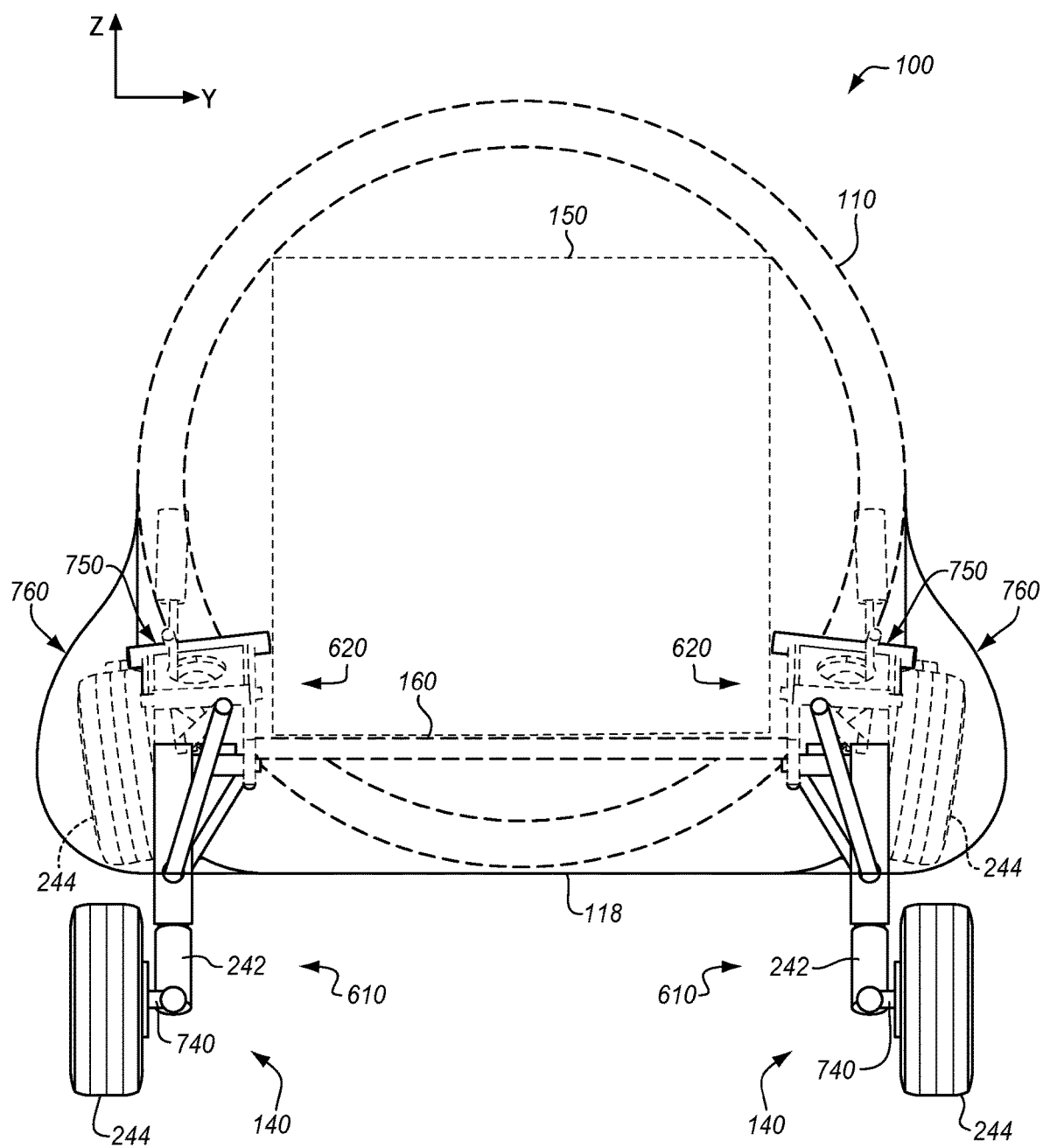

LANDING GEAR FOR CARGO AIRCRAFT

FIELD

This disclosure relates to the field of aircraft and, in particular, to landing gear for an aircraft.

BACKGROUND

Aircraft landing gears may retract during flight and extend for landing. A typical aircraft includes a wheel well that houses the landing gear during flight to reduce aerodynamic drag. However, some aircraft, such as cargo aircraft, may not include a wheel well in order to maximize interior space for cargo. Cargo aircraft also sometimes include high wings on an upper portion of the fuselage to maximize cargo space. With high wings, the landing gear is typically mounted to the fuselage. With the wings and wing-mounted engines higher off the ground, the center of gravity of the aircraft is higher as compared to a passenger aircraft. Furthermore, a cargo aircraft may have low ground clearance to facilitate loading and unloading cargo onto the cargo floor of the aircraft. Therefore, it would be desirable to have a landing gear arrangement for a cargo aircraft that takes into account these considerations.

SUMMARY

Embodiments described herein provide landing gears for an aircraft. The aircraft includes a pair of nose landing gears at either side of the fuselage, and a pair of main landing gears at either side of the fuselage. The nose landing gears retract by swinging inward to have a low profile underneath the belly of the aircraft to reduce aerodynamic drag in the absence of a wheel well. The nose landing gears are widely set to increase ground stability of the aircraft and enable the main landing gear to be attached farther inboard. This, in turn, enables the main landing gears to be positioned more directly underneath the load allowing the main landing gears to comprise a simplified structure and reduced weight. Furthermore, the main landing gears retract forward to maintain a minimal front profile disposed outside the fuselage. This also advantageously enables increased cargo space and reduced aerodynamic drag in the absence of a wheel well.

One embodiment is an aircraft that includes a fuselage including a nose, and a pair of main landing gears comprising a pair of main posts disposed across the fuselage, each main post having a main wheel and configured to pivot forward toward the nose to retract the main wheel. The aircraft also includes a pair of nose landing gears comprising a pair of nose posts disposed across the fuselage, each nose post having a nose wheel and configured to pivot inboard to retract the nose wheel.

Another embodiment is an aircraft that includes a fuselage including a nose, and a pair of nose landing gears comprising a pair of nose posts disposed across the fuselage. Each nose post has a nose wheel and is configured to pivot inboard to retract the nose wheel toward a center line extending longitudinally along a belly of the fuselage. Retraction of the pair of nose landing gears is symmetric about the center line.

Yet another embodiment is an aircraft that includes a fuselage including a nose, and a cargo floor extending longitudinally along the fuselage. The aircraft also includes a pair of main landing gears comprising a pair of main posts disposed across the fuselage, each main post having a main wheel and configured to pivot forward toward the nose to retract the main wheel to a retracted position where the main wheel is outboard from the cargo floor with at least a portion of the main wheel higher than the cargo floor.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 7 is a rear view of the pair of main landing gears of the aircraft in an illustrative embodiment.

DETAILED DESCRIPTION

The figures and the following description illustrate specific example embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
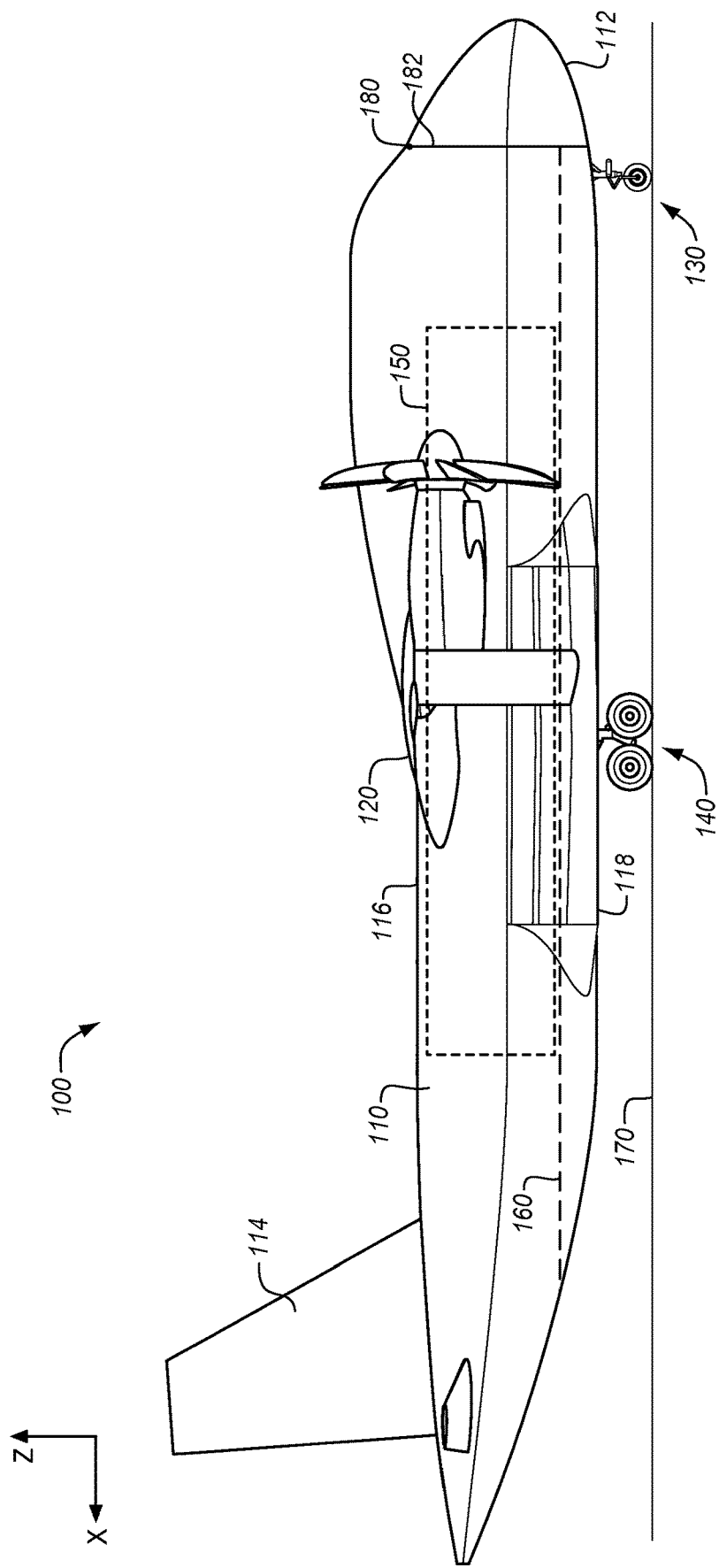
FIG. 1 is a side view of an aircraft in an illustrative embodiment.

FIG. 1 is a side view of an aircraft 100 in an illustrative embodiment. The aircraft 100 includes a fuselage 110 including a nose 112, and also includes tail 114. The aircraft 100 also includes wings 120, nose landing gear 130, and main landing gear 140. As described in greater detail below, the aircraft 100 is enhanced with an arrangement of the nose landing gear 130 and the main landing gear 140 that provides increased interior space of the fuselage 110, increased ground stability, reduced aerodynamic drag, simplified landing gear structure, and allows the landing gears to extend without hydraulics using gravity and aerodynamic drag.

Features of the nose landing gear 130 and the main landing gear 140 may be applicable in embodiments in which the aircraft 100 is a cargo aircraft. For example, as shown in FIG. 1, the aircraft 100 may include a high-wing configuration in which the wings 120 attach at or near a top 116 of the fuselage 110 to maximize interior space of the fuselage 110 for cargo 150, such as a shipping container. The aircraft 100 may also exclude a wheel well to maximize interior space of the fuselage 110. Additionally, the aircraft 100 may include a cargo floor 160 extending longitudinally along the fuselage 110 to support the cargo 150. The aircraft 100 may have a low-deck configuration in which a height from the ground 170 to a belly 118 of the fuselage 110 or the cargo floor 160 is low for easier loading and unloading of the cargo 150.

Still further, in some embodiments, the nose 112 may include a hinge 180 configured to pivot from a nose frame 182 of the fuselage 110 for loading and unloading the cargo 150 onto the cargo floor 160 through the nose frame 182. Alternatively or additionally, the cargo 150 may be loaded and unloaded proximate to the tail 114. It will be appreciated, however, that the features and functions of the nose landing gear 130 and the main landing gear 140 described in greater detail below may apply to alternative aircraft having some combination of cargo carrying features described above or no such features.

Figure 2:
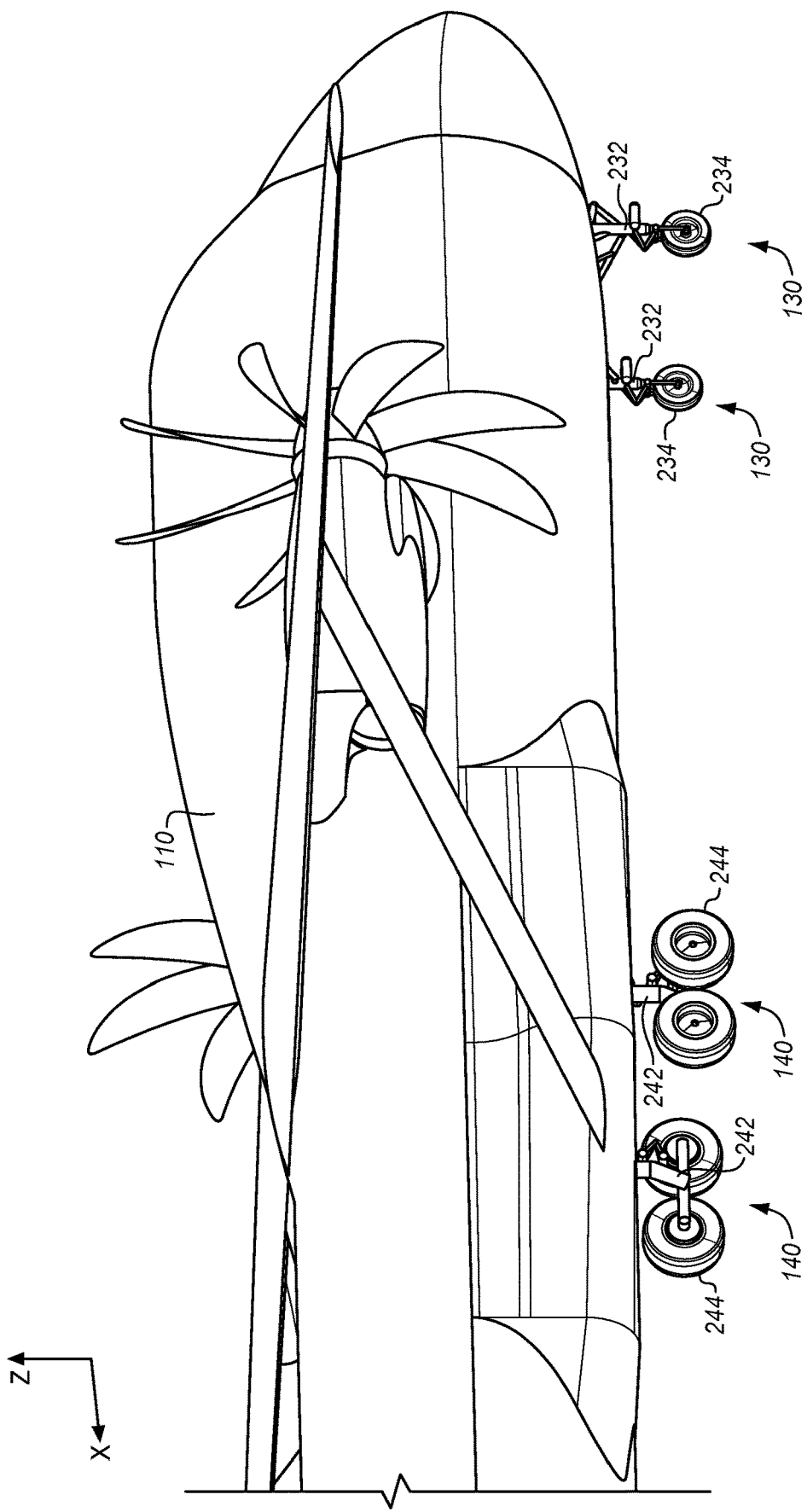
FIG. 2 is a perspective side view of the aircraft in an illustrative embodiment.

FIG. 2 is a perspective side view of the aircraft 100 in an illustrative embodiment. As shown in FIG. 2, the aircraft 100 includes a pair of nose landing gears 130 and a pair of main landing gears 140. Generally, the nose landing gears 130 support the fuselage 110 at a position toward the nose 112, and the main landing gears 140 support the fuselage 110 at a position aft of the nose landing gears 130, toward a middle section between the nose 112 and the tail 114. The pair of nose landing gears 130 comprise a pair of nose posts 232 disposed across the fuselage 110, and at least one nose wheel 234 rotatably attached to each nose post 232. Similarly, the pair of main landing gears 140 comprise a pair of main posts 242 disposed across the fuselage 110, and one or more main wheels 244 rotatably attached to each main post 242. In other words, the nose landing gears 130 and the main landing gears 140 each straddle a center line extending longitudinally along the belly 118 of the fuselage 110. Features of the nose landing gears 130 and the main landing gears 140, including attachment and retract/extend configurations, are described in greater detail below.

Figure 3:
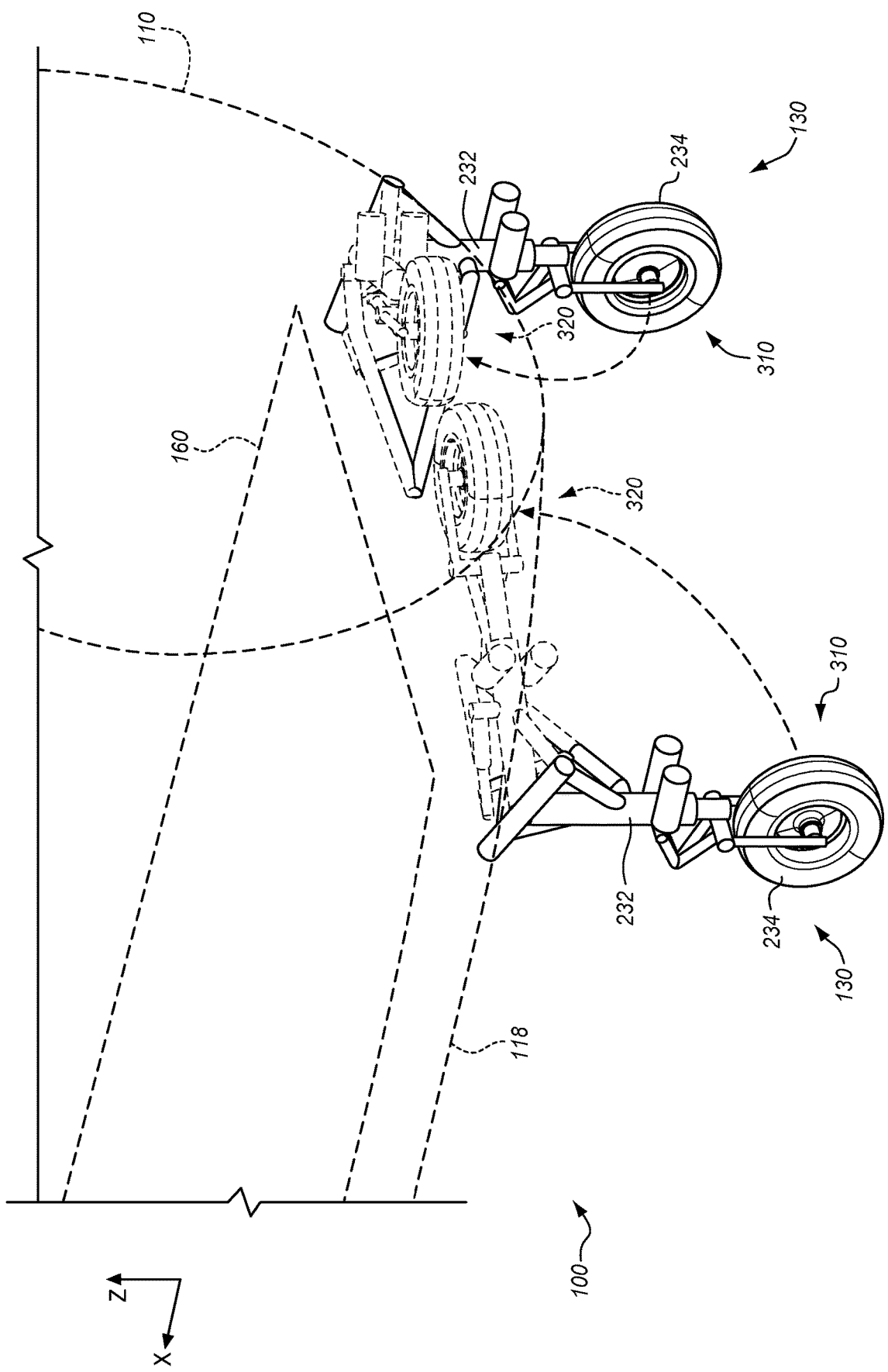
FIG. 3 is a perspective side view of a pair of nose landing gears of the aircraft in an illustrative embodiment.

FIG. 3 is a perspective side view of the pair of nose landing gears 130 of the aircraft 100 in an illustrative embodiment. Each nose landing gear 130 is configured to pivot inboard to retract, as indicated by the dashed arrow lines in FIG. 3. In particular, from an extended position 310 where the nose landing gear 130 supports the aircraft 100 on the ground 170, the nose landing gear 130 pivots inboard to a retracted position 320 where the nose wheel 234 is tucked against and/or into the belly 118 of the fuselage 110. Portions of the nose post 232 and/or nose wheel 234 protruding underneath the belly 118 are minimal in the retracted position 320 to reduce or minimize aerodynamic drag.

Figure 4:
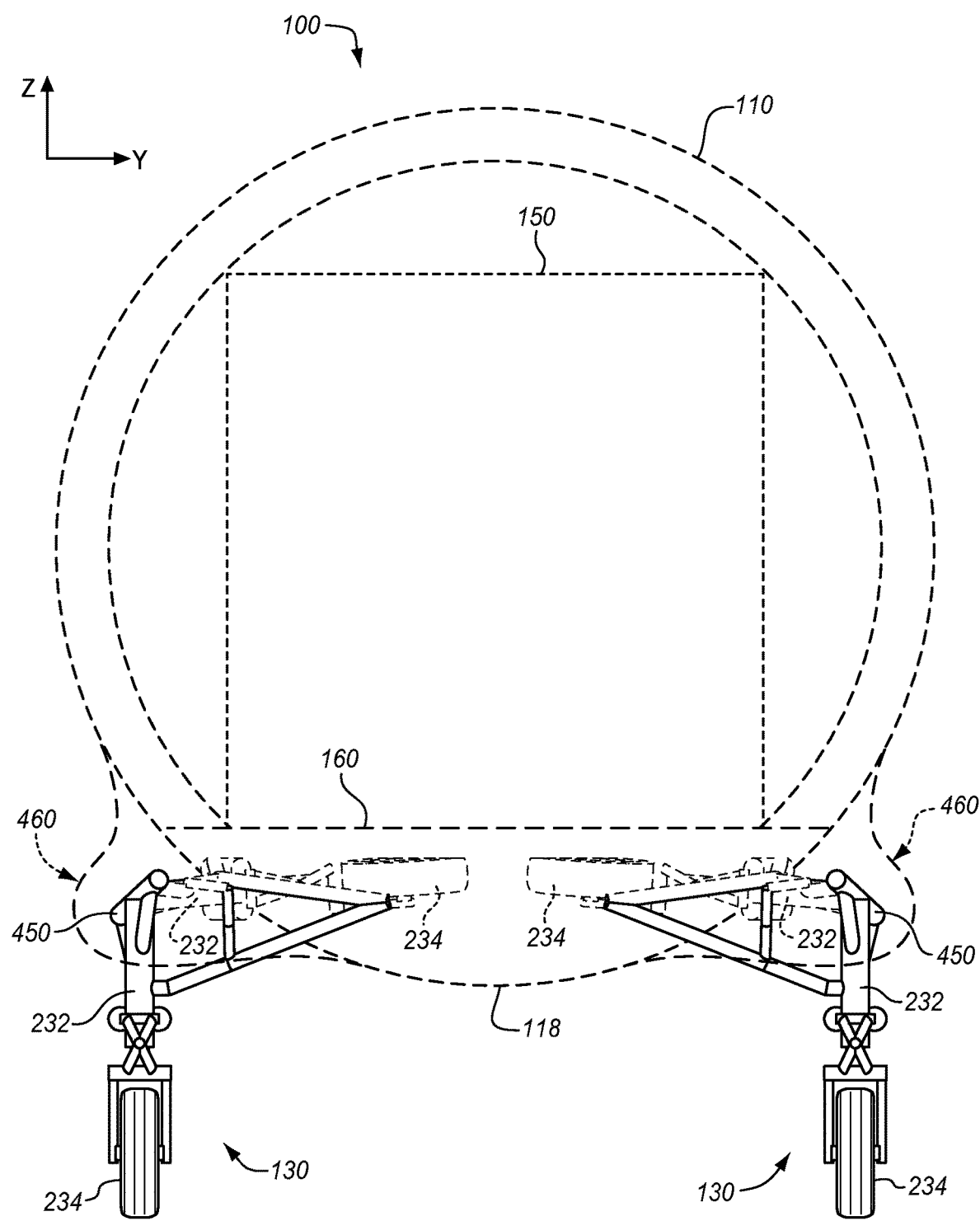
FIG. 4 is a rear view of the pair of nose landing gears of the aircraft in an illustrative embodiment.

FIG. 4 is a rear view of the pair of nose landing gears 130 of the aircraft 100 in an illustrative embodiment. As shown in FIG. 4, each nose post 232 is configured to pivot to retract the nose wheel 234 toward a center of the fuselage 110 underneath the cargo floor 160. In one embodiment, the nose posts 232 are pivotally attached to the aircraft 100 via pivot points 450 disposed outboard from the cargo floor 160. That is, a distance between the pivot points 450 (e.g., in the y-direction) may be larger than a width of the cargo floor 160. The bi-pedal, wide stance configuration of the nose landing gears 130 advantageously increases ground stability of the aircraft 100 to reduce tipping risk. The increased stability helps offset a higher center of gravity the aircraft 100 may have by incorporating a high-wing configuration that carries large cargo items, such as shipping containers. Additionally, by improving the stability of the aircraft 100 with the pair of nose landing gears 130, the pair of main landing gears 140 (not shown in FIG. 4) may be set closer together to simplify the structure of the main landing gears 140, as further described below.

The nose landing gears 130 may attach to the aircraft 100 external to the fuselage 110 to facilitate its wide stance and increased ground stability. The pivot points 450 of the nose posts 232 may therefore be disposed outside the fuselage 110, as shown in FIG. 4. Accordingly, in some embodiments, the aircraft 100 includes a pair of nose fairings 460 mounted to the fuselage 110, and each of the pivot points 450 is disposed outside of the fuselage 110 and inside one of the pair of nose fairings 460. The nose fairings 460 may comprise a low profile that covers the pivot points 450 to reduce aerodynamic drag.

Figure 5:
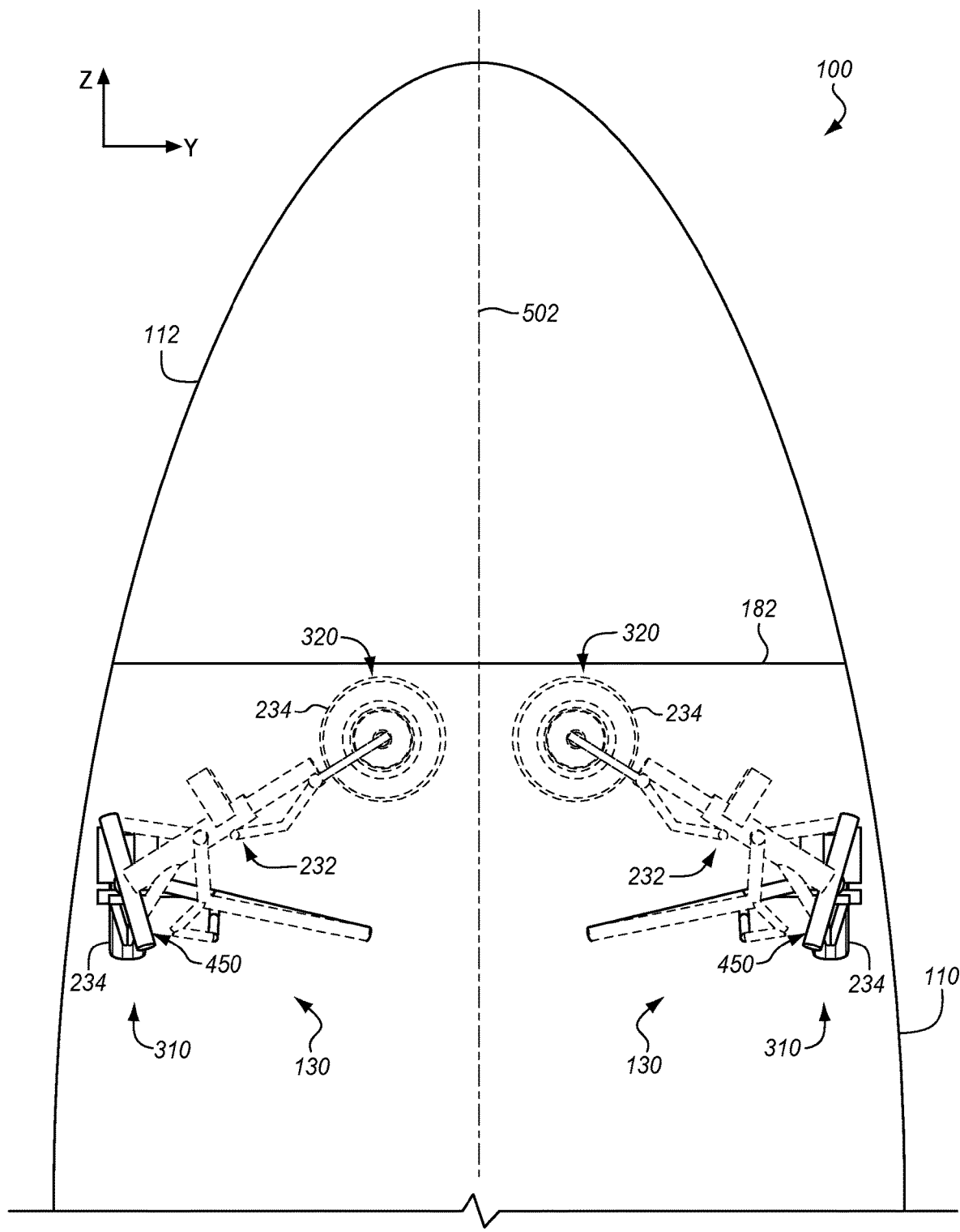
FIG. 5 is a top view of the pair of nose landing gears of the aircraft in an illustrative embodiment.

FIG. 5 is a top view of the pair of nose landing gears 130 of the aircraft 100 in an illustrative embodiment. As shown in FIG. 5, each nose post 232 is configured to pivot inboard (e.g., via hydraulics) to retract the nose wheel 234 toward a center line 502 extending longitudinally along the belly 118 of the fuselage 110, and the retraction of the pair of nose landing gears 130 may be symmetric about the center line 502. In addition to retracting inboard, the nose landing gears 130 may pivot forward (e.g., toward the nose 112) to retract. Therefore, each nose landing gear 130 is configured to extend the nose post 232 to the extended position 310 via gravity and aerodynamic drag. For example, in the event of a hydraulic or power failure of the aircraft 100, each nose landing gear 130 is able to reach the extended position 310 for landing by being lowered from gravitational pull on its weight and being pushed backward by air as the aircraft 100 travels forward.

Still further, for embodiments in which the nose 112 is hinged for loading and unloading cargo through the nose frame 182, the pair of nose landing gears 130 are positioned to avoid interfering with the hinged structure of the nose 112. For example, the pivot points 450 may be disposed aft of the nose frame 182 such that the nose wheels 234 in the retracted position 320 are aft of the nose frame 182.

Figure 6:
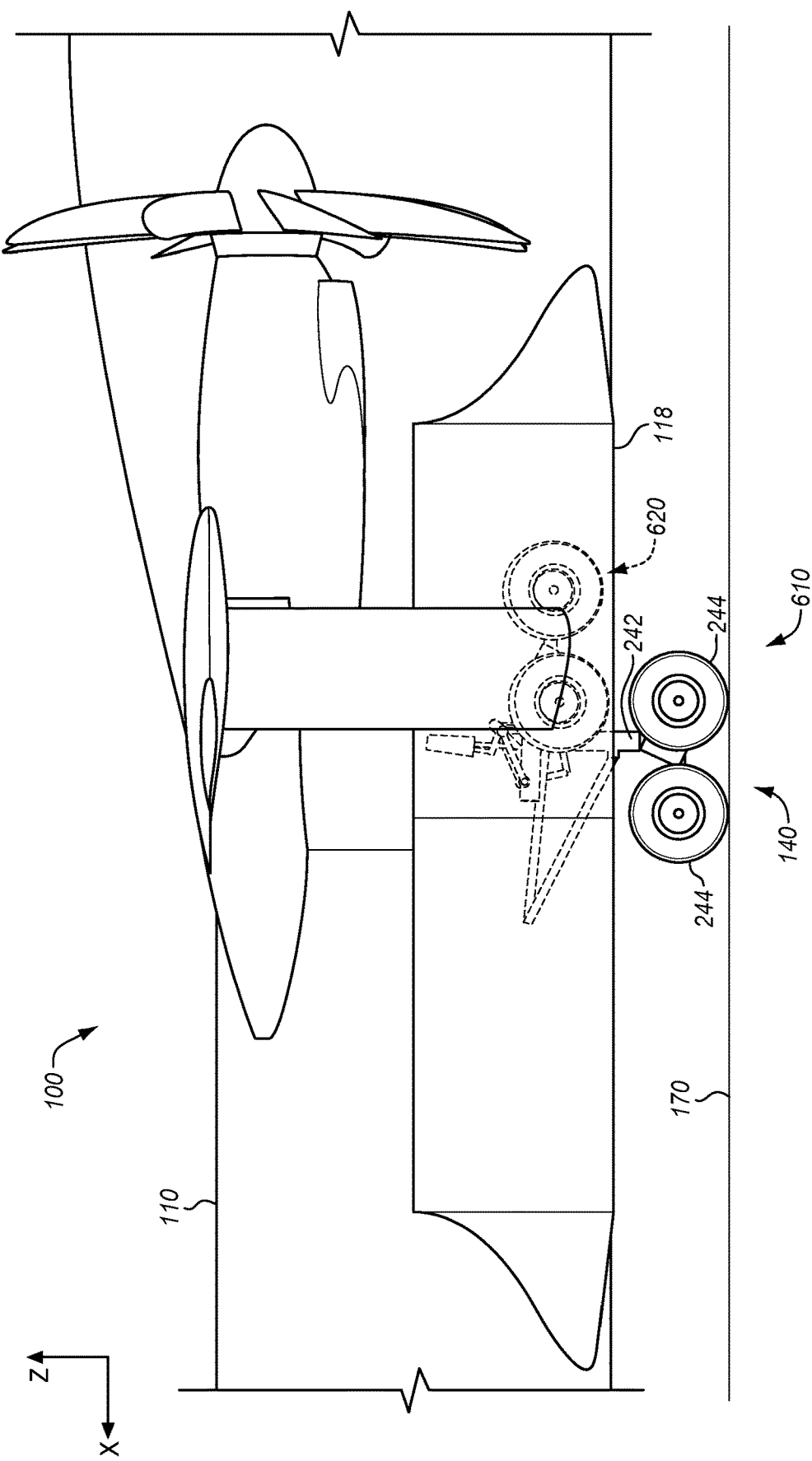
FIG. 6 is a side view of the main landing gear of the aircraft in an illustrative embodiment.

FIG. 6 is a side view of the main landing gear 140 of the aircraft 100 in an illustrative embodiment. Each main landing gear 140 is configured to pivot forward (e.g., toward the nose 112) to retract. In particular, from an extended position 610 where the main landing gear 140 supports the aircraft 100 on the ground 170, the main landing gear 140 pivots forward to a retracted position 620 where the main wheels 244 tuck against the belly 118 and/or side of the fuselage 110. Portions of the main post 242 and/or main wheels 244 protruding from the fuselage 110 is minimal in the retracted position 620 to reduce or minimize aerodynamic drag. Additionally, since the main landing gears 140 retract forward, each main landing gear 140 is configured to extend the main post 242 to the extended position 610 via gravity and aerodynamic drag.

In one embodiment, each main post 242 includes at least two main wheels 244 arranged in tandem longitudinally (e.g., along the x-direction) of the aircraft 100, as shown in FIG. 6. The forward retraction and tandem arrangement of the main wheels 244 advantageously minimizes the front profile of the main landing gears 140 in the retracted position 620 to minimize aerodynamic drag in the absence of a wheel well.

FIG. 7 is a rear view of the pair of main landing gears 140 of the aircraft 100 in an illustrative embodiment. As shown in FIG. 7, each main landing gear 140 is configured to pivot the main post 242 forward toward the nose 112 to retract the main wheel(s) 244 outboard from the cargo floor 160 with at least a portion of the main wheel(s) 244 higher than the cargo floor 160. Each main landing gear 140 may thus be configured to pivot the main post 242 forward and outboard or to sides of the fuselage 110. The main posts 242 may be pivotally attached to the aircraft 100 via pivot attachments 750 disposed outboard from the cargo floor 160. That is, a distance between the pivot attachments 750 (e.g., in the y-direction) may be larger than a width of the cargo floor 160. The wide stance configuration of the main landing gears 140 advantageously increases ground stability of the aircraft 100 to reduce tipping risk. The increased stability helps offset a higher center of gravity the aircraft 100 may have by incorporating a high-wing configuration that carries largo cargo items, such as shipping containers.

The main landing gears 140 may attach to the aircraft 100 external to the fuselage 110 to facilitate its wide stance and increased ground stability. The pivot attachments 750 of the main posts 242 may therefore be disposed outside the fuselage 110, as shown in FIG. 7. Accordingly, in some embodiments, the aircraft 100 includes a pair of body fairings 760 mounted to the fuselage 110, and each of the pivot attachments 750 is disposed outside of the fuselage 110 and inside one of the pair of body fairings 760. The body fairings 760 may comprise a low profile that covers the pivot attachments 750 to reduce aerodynamic drag. Additionally, the forward retraction and tandem arrangement of the main wheels 244 advantageously minimizes the profile of the body fairings 760 to minimize aerodynamic drag in the absence of a wheel well. Still further, the main landing gears 140 retracting to either side of the belly 118 eliminates structure directly underneath the belly 118, thereby enabling the belly 118 and the cargo floor 160 to be lower to the ground to increase ground stability and facilitate loading and unloading of the cargo 150.

In some embodiments, the structure of the main landing gears 140 in the extended position 610 is disposed underneath the cargo floor 160 at either side of the cargo floor 160. That is, an increase in ground stability provided by the bi-pedal configuration of the nose landing gears 130 described above may allow the aircraft 100 to include a stance of the main landing gears 140 that is narrower than that shown in FIG. 7. For example, the pivot attachments 750 may be disposed underneath the cargo floor 160 (e.g., with a width between the pivot attachments 750 that is similar to a width of the cargo floor 160) to simplify the structure of the main landing gears 140 since it is directly under the load path rather than outboard from the load path. Also, in some embodiments, the main landing gears 140 swing forward and up to the retracted position 620 with the main wheels 244 disposed at least partially above, at a same height, or below the cargo floor 160. The tandem arrangement of the main wheels 244 may be coupled via a truck beam 740 attached to the main post 242.

Although specific embodiments were described herein, the scope is not limited to those specific embodiments. Rather, the scope is defined by the following claims and any equivalents thereof

What is claimed is:

1. A cargo aircraft comprising:
a fuselage that is cylindrical and includes a nose;
a cargo floor;
wings attached to an upper portion of the fuselage, resulting in a high-wing configuration for the cargo aircraft;
a pair of main landing gears comprising a pair of main posts disposed across the fuselage, each main post having a main wheel and configured to pivot forward toward the nose and outboard to retract the main wheel, wherein a retracted position of each main wheel is outside the fuselage and outside a structure of the wings, and in the retracted position at least a portion of each main wheel is higher than the cargo floor; and
a pair of nose landing gears comprising a pair of nose posts disposed across the fuselage, each nose post having a nose wheel and configured to pivot inboard to retract the nose wheel, wherein pivot points of the main landing gears are disposed inboard of pivot points of the nose landing gears.

2. The cargo aircraft of claim 1 wherein:
the cargo floor extends longitudinally along the fuselage,
wherein each main landing gear is configured to pivot the main post forward toward the nose to retract the main wheel to the retracted position where the main wheel is outboard from the cargo floor.

3. The cargo aircraft of claim 2 further comprising:
a pair of body fairings mounted to the fuselage,
wherein each main post includes at least two main wheels arranged in tandem longitudinally; and
wherein the at least two main wheels in the retracted position are disposed outside of the fuselage and inside one of the pair of body fairings.

4. The cargo aircraft of claim 1 wherein:
the nose posts of the nose landing gear are pivotally attached to the aircraft via the pivot points of the nose landing gears disposed outboard from the cargo floor; and
the main posts of the main landing gear are pivotally attached to the aircraft via the pivot points of the main landing gears disposed underneath the cargo floor directly under a load path of the aircraft.

5. The cargo aircraft of claim 1 wherein:
the main posts of the main landing gears are disposed inboard of wheels of the main landing gears while the main landing gears are retracted.

6. The cargo aircraft of claim 1 wherein:
the cargo floor extends longitudinally along the fuselage,
wherein each nose landing gear is configured to pivot the nose post to a retracted position to move the nose wheel toward a center of the fuselage underneath the cargo floor.

7. The cargo aircraft of claim 6 further comprising:
a pair of nose fairings mounted to the fuselage,
wherein each of the pivot points is disposed outside of the fuselage and inside one of the pair of nose fairings.

8. The cargo aircraft of claim 1 wherein:
each nose landing gear is configured to pivot the nose post inboard and forward toward the nose.

9. The cargo aircraft of claim 1 wherein:
each nose landing gear is configured to extend the nose post to an extended position via gravity and aerodynamic drag.

10. A cargo aircraft comprising:
a fuselage that is cylindrical and includes a nose;
a cargo floor extending longitudinally along the fuselage;
a pair of nose landing gears comprising a pair of nose posts disposed across the fuselage, each nose post having a nose wheel and configured to pivot inboard to retract the nose wheel toward a center line extending longitudinally along a belly of the fuselage, wherein retraction of the pair of nose landing gears is symmetric about the center line; and
main landing gears, wherein pivot points of the main landing gears are disposed inboard of pivot points of the nose landing gears, the pair of nose posts are pivotally attached to the aircraft via the pivot points of the nose landing gears, and the pivot points of the nose landing gears are disposed outboard from the cargo floor, wherein the main landing gears each include a main wheel, are configured to retract forward toward a nose of the aircraft and outboard, and in a retracted position at least a portion of each main wheel is higher than the cargo floor.

11. The cargo aircraft of claim 10 wherein:

each nose landing gear is configured to pivot the nose post to a retracted position to move the nose wheel toward the center line and underneath the cargo floor.

12. The cargo aircraft of claim 11 wherein:

the nose includes a hinge configured to pivot from a nose frame of the fuselage for loading cargo onto the cargo floor through the nose frame, and the pair of nose posts are pivotally attached to the fuselage via the pivot points of the nose landing gears disposed aft of the nose frame.

13. The cargo aircraft of claim 12 further comprising:

a pair of nose fairings mounted to the fuselage, wherein each of the pivot points of the nose landing gears is disposed outside of the fuselage and inside one of the pair of nose fairings.

14. The cargo aircraft of claim 10 wherein:

each nose landing gear is configured to pivot the nose post inboard and forward toward the nose.

15. A cargo aircraft comprising:

a fuselage that is cylindrical and includes a nose;

a cargo floor extending longitudinally along the fuselage;

wings attached to an upper portion of the fuselage, resulting in a high-wing configuration for the cargo aircraft;

a pair of main landing gears comprising a pair of main posts disposed across the fuselage, each main post having a main wheel and configured to pivot forward toward the nose and outboard to retract the main wheel to a retracted position where the main wheel is outboard from the cargo floor with at least a portion of the main wheel higher than the cargo floor, wherein the retracted position of each main wheel is outside the fuselage and outside a structure of the wings, and in the retracted position at least a portion of each main wheel is higher than the cargo floor; and a pair of nose landing gears having nose posts, wherein pivot points of the main landing gears are disposed inboard of pivot points of the nose landing gears.

16. The cargo aircraft of claim 15 further comprising:

a pair of body fairings mounted to the fuselage, wherein each main post includes at least two main wheels arranged in tandem longitudinally, and wherein the at least two main wheels in the retracted position are disposed outside of the fuselage and inside one of the pair of body fairings.

17. The cargo aircraft of claim 15 wherein:

the pair of nose posts are pivotally attached to the aircraft via pivot points disposed outboard from the cargo floor.

18. The cargo aircraft of claim 15 wherein:

the pivot points of the main landing gears are disposed underneath the cargo floor.

19. The cargo aircraft of claim 15 wherein:

each main landing gear is configured to pivot the main post forward and outboard from the cargo floor.

20. The cargo aircraft of claim 15 wherein:

each main landing gear is configured to extend the main post to an extended position via gravity and aerodynamic drag.

* * * * *